United States Patent [19]
Koenig et al.

[11] 3,710,300
[45] Jan. 9, 1973

[54] CLAMPING ADJUSTMENT FEATURE FOR BUS DUCT HOUSING

[75] Inventors: Martin F. Koenig, Milwaukee, Wis.; Frank A. De Backer, Wichita, Kans.; Manuel Issa, deceased, late of Milwaukee, Wis.; Patrick T. Sheedy, administrator, Fox Point, Wis.

[73] Assignee: Cutter-Hammer, Inc., Milwaukee, Wis.

[22] Filed: March 5, 1971

[21] Appl. No.: 121,489

[52] U.S. Cl. ............... 339/22 B, 174/68 B, 174/99 B
[51] Int. Cl. ................................................ H01r 13/60
[58] Field of Search ............... 339/22, 14; 248/316 A; 24/73 LA, 263 LS, 263 R; 174/68 B, 72 B, 99 B

[56] References Cited

UNITED STATES PATENTS

| | | | |
|---|---|---|---|
| 3,018,320 | 1/1962 | Rowe | 174/99 |
| 2,303,999 | 12/1942 | Huguelet | 174/149 |
| 3,497,860 | 2/1970 | Jorgensen et al. | 339/14 R |
| 2,318,859 | 5/1943 | Huguelet | 248/68 |
| 2,604,805 | 7/1952 | Haffner | 84/318 |
| 3,183,299 | 5/1965 | Johnston et al. | 174/99 |
| 3,088,994 | 5/1963 | Cataldo | 174/99 |

*Primary Examiner*—Marvin A. Champion
*Assistant Examiner*—Robert A. Hafer
*Attorney*—Hugh R. Rather et al.

[57] ABSTRACT

A two-part housing for a plug-in bus duct having longitudinally extending corrugations in the opposite sidewalls cooperatively supporting a plurality of spaced insulated bus bars along their opposite edges. Upper and lower walls of each housing part meet in overlapped relationship and are secured together by longitudinally spaced screws which extend through slotted or exaggerated clearance holes in one wall to thread into alined extruded holes in the other wall, the clearance holes providing inward adjustment of the housing parts during tightening of the screws to provide intimate contact between bus bars and sides for maximum heat dissipation regardless of tolerance conditions. An alternative construction includes a ground bus bar adjacent the overlapped lower walls with clearance holes in each wall and the screws threading into alined holes in the ground bar to position the bar and provide for added electrical continuity from bar to housing as well as secure the housing.

1 Claim, 3 Drawing Figures

PATENTED JAN 9 1973 3,710,300
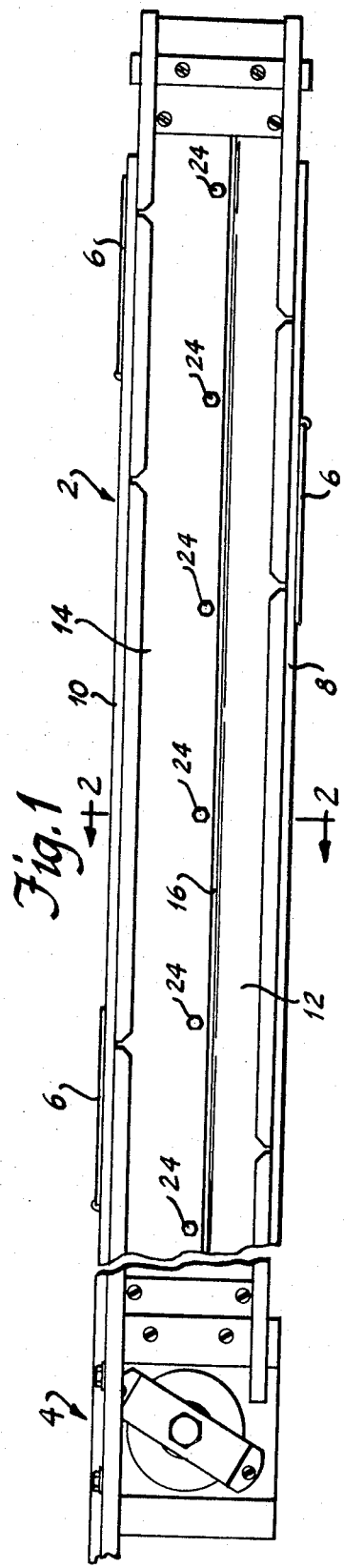
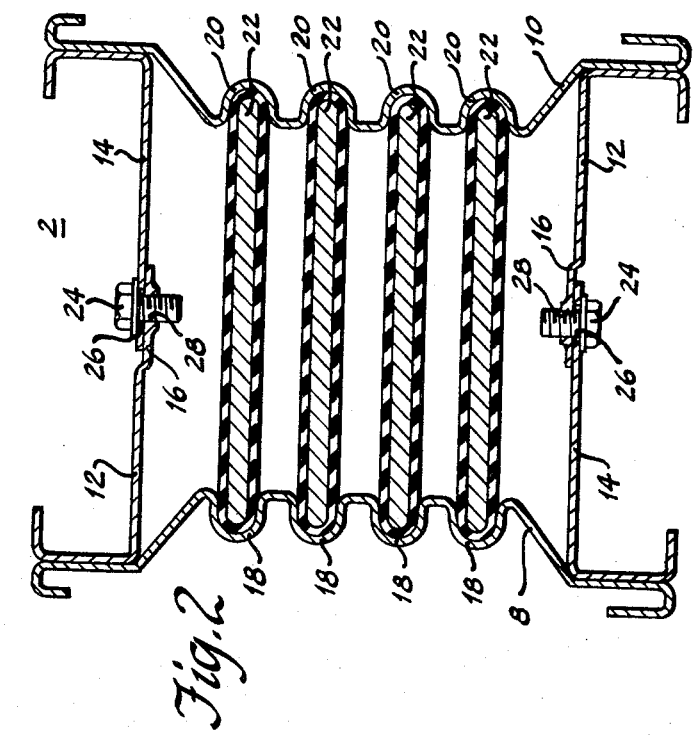
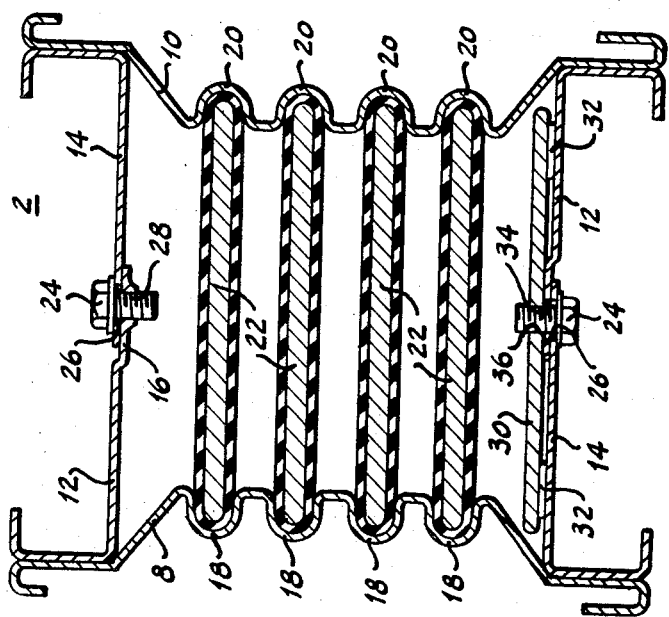

3,710,300

CLAMPING ADJUSTMENT FEATURE FOR BUS DUCT HOUSING

BACKGROUND OF THE INVENTION

This invention relates to plug-in bus ducts and more particularly to metallic housings used therein.

Plug-in bus ducts comprise elongated housing structures having a plurality of insulated bus bars supported in spaced apart relation therein with longitudinally spaced access points to facilitate plug-in electrical connection with the bus bars. Dissipation of the heat generated by the high currents flowing through the bus bars is a major problem in plug-in bus duct design. Present constructions provide for thermally conductive contact between the insulated bus bars and the metallic housings to provide good heat dissipation, such contact being provided by forming the sidewalls with bus bar supporting formations such as corrugations or the like. Since bus duct sections are quite long, dimensional tolerances for the bus bars, their insulation, and the housing members may vary considerably at different points along the length of the duct and such variances adversely effect the intimate contact between bus bars and housing necessary for maximum heat dissipation.

SUMMARY OF THE INVENTION

It is therefor a primary object of this invention to provide a housing for a plug-in bus duct which provides good thermally conductive contact with the insulated bus bars all along the length thereof.

It is a further object of this invention to provide a plug-in bus duct housing of the above type wherein means are provided to automatically compensate in assembly thereof for tolerance variations of the bus bars, insulation and housing.

It is still a further object of this invention to provide an improved plug-in bus duct of the above type without introducing additional parts, assembly procedures or cost to the structure.

These and other objects and advantages will become more apparent in the following specification and claims when read in conjunction with the appended drawing.

BRIEF DESCRIPTION OF THE DRAWING

FIG. 1 is a top plan view of a section of plug-in bus duct constructed in accordance with this invention;

FIG. 2 is a cross-sectional view of the bus duct of FIG. 1 taken generally along the line 2—2 in FIG. 1 and drawn to a greater scale; and FIG. 3 is a cross-sectional view similar to FIG. 2 but showing a modified form of the invention.

DESCRIPTION OF THE PREFERRED EMBODIMENTS

Referring to the drawings and particularly FIG. 1 thereof, a section of plug-in bus duct 2 is shown in top plan. As such sections are normally quite long, a segment is broken out of the left-hand end of the bus duct to facilitate the drawings. The left-hand end of bus duct 2 has a joint connector 4 secured thereon to connect that end of bus duct 2 to the right-hand end of an adjacent bus duct section. Plug-in bus duct 2 is further provided with a plurality of access openings covered by hinged doors 6, the openings being longitudinally spaced at regular intervals along the opposite sides of the duct.

Referring next to FIG. 2 the housing structure of bus duct 2 may be seen to comprise a pair of mirror image formed sheet metal side members 8 and 10 and pairs of oppositely disposed transverse members 12 and 14. As may be seen in the drawing, individual members from each pair of members 12 and 14 cooperate to form the upper and lower walls of the housing. One member 12 is secured as by welding along the upper end of side member 8 and the other member 12 is similarly secured along the lower end of side member 10. An offset flange 16 is formed along the inner longitudinal edge of each member 12. The members 14 are secured as by welding along the upper end of side member 10 and the lower end of side member 8 to project inwardly toward the corresponding members 12 and overlap the flanges 16 thereof.

Side members 8 and 10 are formed with a plurality of oppositely disposed and transversely alined corrugations 18 and 20, respectively. The corrugations serve to firmly support the opposite edges of a plurality of longitudinally extending insulated bus bars 22, the contact between the bus bars and corrugations being thermally conductive to transfer the heat generated by the current in the bus bars to the housing where it may be dissipated by radiation.

To insure good lateral contact between the corrugations 18 and 20 and the bus bars 22, an adjustment feature is provided by the housing. Members 12 and 14 are secured together at longitudinally spaced regular intervals by a plurality of thread rolling screws 24 which pass through holes 26 in members 14 to thread into alined extruded openings 28 in members 12. The holes 26 may be formed as transversely extending slots or oversized clearance holes, but in either case sufficient transverse clearance should exist to permit inward movement of the members 14 relative to the members 12. By applying inward pressure on the sides 8 and 10 of the bus duct housing as the screws 24 are tightened into openings 28, the sides are forced into intimate, thermally conductive contact with the bus bars 22 all along the length thereof regardless of tolerance variations in the bus bars, their insulation or the corrugations. Since the total heat dissipation for the bus bars is achieved through the thermally conductive contact thereof with the housing, good edgewise contact all along the length of the bus bars is imperative to obtain maximum heat dissipation.

In some bus duct applications a ground bus bar is required, and the bus duct of this invention is shown modified to employ a ground bar 30 in FIG. 3. The ground bus bar 30 is required to be held firmly against the housing and the lower screws 24 serve this purpose as well as securing the housing halves together as well as insuring good electrical contact between bar and housing. Ground bar 30 is provided with bosses 32 near the edges and spaced along the length thereof which extend beyond the surface of the bar an amount equal to the thickness of offset flange 16 to maintain the bar firmly against the lower wall. The extruded openings 28 in lower member 12 are reamed out or otherwise formed to be oversized clearance holes 34 and bus bar 30 is provided with a plurality of holes 36 for threadably receiving lower screws 24 therein. Thus the same inward adjustment is possible in the bus duct structure of FIG. 3 as was described in connection with the structure of FIG. 2 and the ground bus bar 30 is held firmly in place without requiring additional fastening means therefor.

We claim:

1. A plug-in bus duct comprising, in combination:
a plurality of longitudinally extending insulated bus bars;
a two-part elongated metallic housing surrounding said bus bars, each housing part having a sidewall and inwardly extending top and bottom wall portions, the respective top and bottom wall portions of each housing part joining in overlapped relationship;
a plurality of longitudinally extending corrugations formed in each of said sidewalls, alined ones of said corrugations cooperating to receive the opposite edges of the respective bus bars therein to support said bus bars between said housing parts;
a plurality of first openings formed in the outer ones of the respective top and bottom wall portions and a plurality of second openings formed in the inner ones of the respective top and bottom wall portions in substantial alinement with said first openings;
a plurality of threaded fasteners projecting through said first openings and being threadably received in said second openings in the respective top wall members, said fasteners having head portions adjacent the outer wall portion to clamp the latter firmly between said head portions and the respective inner wall portion;
a ground bus bar provided in said metallic housing adjacent said bottom wall portions, said ground bus bar having openings therein in substantial alinement with said alined first and second openings in said bottom wall portions;
a plurality of threaded fasteners projecting through said first and second openings in the respective bottom wall portions and being threadably received in said openings in said ground bus bar, said fasteners having head portions adjacent the outer wall portion to clamp said outer and inner wall portions together between said head portion and said ground bus bar; and
wherein said first openings in said top wall portions and said first and second openings in said bottom wall portions are formed to permit movement of said outer wall portions relative to said inner wall portions before tightening said fasteners to permit said housing parts to be urged tightly together to provide firm engagement between said corrugated sidewalls and said edges of said bus bars.

* * * * *